US011829849B2

(12) United States Patent
Byers et al.

(10) Patent No.: US 11,829,849 B2
(45) Date of Patent: Nov. 28, 2023

(54) DYNAMIC ORCHESTRATION OF MACHINE LEARNING FUNCTIONS ON A DISTRIBUTED NETWORK

(71) Applicant: Cisco Technology, Inc., San Jose, CA (US)

(72) Inventors: Charles Calvin Byers, Wheaton, IL (US); Joseph M. Clarke, Cary, NC (US); Gonzalo A. Salgueiro, Raleigh, NC (US); M. David Hanes, Lewisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1155 days.

(21) Appl. No.: 16/244,083

(22) Filed: Jan. 9, 2019

(65) Prior Publication Data
US 2020/0219007 A1 Jul. 9, 2020

(51) Int. Cl.
G06N 20/00 (2019.01)
G06F 11/30 (2006.01)
G06F 11/34 (2006.01)
G06N 5/04 (2023.01)

(52) U.S. Cl.
CPC ......... *G06N 20/00* (2019.01); *G06F 11/3024* (2013.01); *G06F 11/3409* (2013.01); *G06N 5/04* (2013.01)

(58) Field of Classification Search
CPC ...... G06N 20/00; G06N 5/04; G06F 11/3024; G06F 11/3409
USPC .......................................................... 706/12
See application file for complete search history.

(56) References Cited

U.S. PATENT DOCUMENTS

| 2015/0333992 | A1* | 11/2015 | Vasseur | H04L 43/0876 |
| | | | | 370/252 |
| 2017/0124487 | A1 | 5/2017 | Szeto et al. | |
| 2017/0264493 | A1 | 9/2017 | Cencini et al. | |
| 2018/0198812 | A1* | 7/2018 | Christodorescu ... | H04L 63/1425 |
| 2019/0289038 | A1* | 9/2019 | Li | H04L 67/56 |

FOREIGN PATENT DOCUMENTS

| WO | 2018009159 A1 | 1/2018 |
| WO | 2018009205 A1 | 1/2018 |

OTHER PUBLICATIONS

Pan et al., "Key Enabling Technologies for Secure and Scalable Future Fog-IoT Architecture: A Survey", arXiv: 1806.06188v1 [cs.NI] Jun. 16, 2018, 7 pages.
Sureddy et al., "Flexible Deep Learning in Edge Computing for IoT", International Journal of Pure and Applied Mathematics, vol. 119 No. 10 2018, 531-543, pp. 531-542.

* cited by examiner

*Primary Examiner* — Hope C Sheffield
(74) *Attorney, Agent, or Firm* — Patterson + Sheridan, LLP (57) ABSTRACT

Techniques for orchestrating a machine learning (ML) system on a distributed network. Determined performance levels for a ML system, determined from performance data received from the distributed network, are compared to performance requirements from the ML system. An orchestration module for the ML system then determines adjustments for the ML system that will improve the performance of the ML system and executes the adjustments for the ML system.

17 Claims, 4 Drawing Sheets

DYNAMIC ORCHESTRATION OF MACHINE LEARNING FUNCTIONS ON A DISTRIBUTED NETWORK

TECHNICAL FIELD

Embodiments presented in this disclosure generally relate to machine learning functions executing in a distributed network. More specifically, embodiments disclosed herein include dynamically adjusting learning and inference functions of a machine learning system to meet performance requirements for the machine learning system.

BACKGROUND

Networked applications and systems increasingly use machine learning systems to learn and adapt to various and changing network conditions experienced by the applications. The machine learning functions are initially deployed on distributed networks to optimize efficiency of the network resources and the speed and efficiency of the machine learning system. However, in some cases the initial deployment of the machine learning functions is not optimized to respond for network conditions. Redeployment of the machine learning functions is often delayed and not responsive to current or rapidly evolving application requirements.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for dynamically orchestrating a machine learning (ML) system on a network. The method including: receiving, at an ML orchestration system for the network, performance data for the ML system, where the ML system includes a ML learning function and a ML inference function; determining from the performance data a performance level for the ML system; comparing the determined performance level to one or more ML performance requirements for the ML system; determining, based on the comparison, one or more system adjustments to the ML learning function and to the ML inference function; and executing the one or more system adjustments. Other embodiments of this aspect include corresponding computer systems, apparatus, and computer programs recorded on one or more computer storage devices, each configured to perform the actions of the methods.

One general aspect includes a system for dynamically orchestrating a machine learning (ML) system on a network, including: a processor; and a memory including instructions which, when executed on the processor, performs an operation. The operation including: receiving, at an ML orchestration system for the network, performance data for the ML system, where the ML system includes a ML learning function and a ML inference function; determining from the performance data a performance level for the ML system; comparing the determined performance level to one or more ML performance requirements for the ML system; determining, based on the comparison, one or more system adjustments to the ML learning function and to the ML inference function; and executing the one or more system adjustments. Other embodiments of this aspect include corresponding computer systems, apparatus, and computer programs recorded on one or more computer storage devices, each configured to perform the actions of the methods.

One general aspect includes a computer program product for dynamically orchestrating a machine learning (ML) system on a network, the computer program product including a non-transitory computer-readable medium program having program instructions embodied therewith, the program instructions executable by a processor to perform an operation including: receiving, at an ML orchestration system for the network, performance data for the ML system, where the ML system includes a ML learning function and a ML inference function; determining from the performance data a performance level for the ML system; comparing the determined performance level to one or more ML performance requirements for the ML system; determining, based on the comparison, one or more system adjustments to the ML learning function and to the ML inference function; and executing the one or more system adjustments. Other embodiments of this aspect include corresponding computer systems, apparatus, and computer programs recorded on one or more computer storage devices, each configured to perform the actions of the methods.

EXAMPLE EMBODIMENTS

Artificial Intelligence, Deep Learning, Continuous Learning, and other Machine Learning (ML) techniques and systems (herein referred as ML systems) are applied in many applications and systems to improve the speed, performance, and utility of the applications. The machine learning systems are often used to enable the application to learn and adapt to runtime conditions. For example, applications and systems executing on distributed networks often adjust to changing network and application conditions in real-time. The ML systems provide enhanced performance and utility of the applications and the network elements in the distributed network by allowing the application and network to efficiently respond to network conditions as they occur.

For some applications executing on distributed networks, the ML systems are exposed to varying and changing network conditions that may require redeploying the ML functions on the distributed network to ensure that the ML system responds according to performance requirements of the application using the ML system. For example, internet-of-things (IoT) applications include critical performance requirements, such as latency requirements and/or throughput requirements. IoT applications may also include other requirements such as a network bandwidth for a network (e.g., the amount of data sent between different parts of a ML system), a level of storage performance and capacity in the network, a level of network security (e.g., how data is protected across the network), and/or management requirements for the network (e.g., how efficiently the functions of the ML system are configured, monitored and orchestrated. In some network conditions, the ML functions may not meet performance requirements without redeploying the ML functions closer to the source of the data, such as the connected IoT devices.

Additionally, there may be different performance requirements on the ML learning or training phase of a ML system and the ML inference or implementation phase. The learning phase of ML systems are typically processor intensive but less real-time critical, such that the learning phase can be performed in the cloud, on off-line, or on near-line servers. The inference phase of a ML system is often in series with real-time control loops such that the ML inference phase reacts very quickly to abnormal conditions, but the ML inference phase can require less processing resources and execute on local nodes lower in the distributed network levels, such as fog nodes in a fog network level.

Additionally, sophisticated IoT applications have performance requirements on the combination of both learning and inference, with nearly continuous, real-time updating of the deep learning models. In another example, some IoT applications have highly dynamic deployment models, where the time criticality of both the ML learning and inference functions varies over time. For example, in a continuous learning network security system, new security threats must be uncovered and added to the inference models with minimal delay in order to address emergent threats. Changing workload requirements on various cloud, fog, and edge nodes of the various network levels make performance guarantees for all phases of the ML systems difficult.

Furthermore, different processor types may be available in different layers/levels of the network (Cloud, Fog, Edge, Endpoint, etc.). These can include traditional central processing units (CPUs) (x86, ARM, etc.), Field Programmable Gate Array (FPGA) farms, Graphics Processing Units (GPUs) (e.g., GPUs with thousands of processor cores optimized for graphical and matrix operations), and Tensor Processing Units (TPUs) (e.g., arrays of specialized processors optimized for machine learning and neural network applications). Optimally deploying the ML functions on the different processing resources along with the deploying the ML functions on the appropriate network level and balancing the resource distribution has traditionally been hard to achieve. For example, previous methods do not control both ML learning phases and ML inference phases, and therefore do not respond quickly or efficiently to the stringent demands of the phases of a ML system in critical applications, such as in IoT environments.

The systems and methods described herein provide an ML orchestration module which considers the performance impacts of both the ML learning and ML inference phases concurrently at the ML orchestration module, and dynamically adjusts the depth of the ML functions in the network levels (cloud/fog/edge) and redeploys the ML functions on the various processing resources (CPU/FPGA/GPU/TPU) to efficiently meet system performance requirements.

Figure 1:
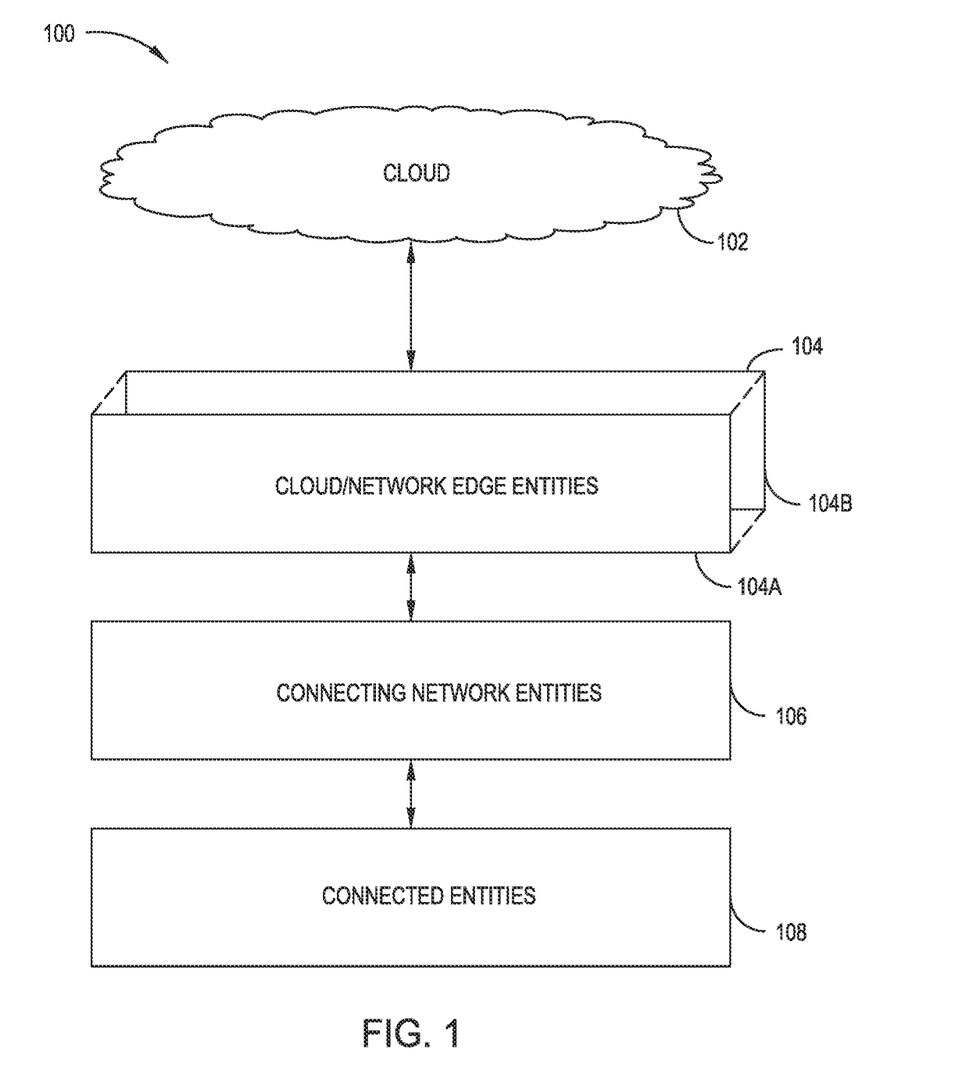
FIG. 1 illustrates a distributed network, according to one embodiment.

FIG. 1 illustrates a distributed network, according to one embodiment. The distributed network 100 includes a cloud network level 102, a cloud/network edge entities level 104, a connecting network entities level 106, and a connected entities network level 108. The distributed structure of the network 100 allows for applications and systems to utilize and maximize the differing network level properties to achieve a balance between a performance of the application executing on the network 100 and the efficiency of use for the network resources. The different network levels each provides a different type of network utility.

For example, the cloud network level 102 provides cloud computing resources for an application in the distributed network 100. Cloud computing generally refers to the provision of scalable computing resources as a service over a network. In some examples, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows an application to access virtual computing resources (e.g., storage, data, applications, and even complete virtualized computing systems) in "the cloud," without regard for the underlying physical systems (or locations of those systems) used to provide the computing resources. In some examples, the cloud network level 102 is used by an application on the network 100 to execute long term and/or processing resource intensive functions that are not real-time sensitive as related to connected entities/devices on the network 100. This allows the application to utilize the relatively lower cost processing resources at the cloud network level 102. When an application process/function requires a greater level of real-time interaction with the connected device entities, the application process/function executes closer to the connected entity such as on the cloud/network edge entities network level 104 and/or the connecting network entities network level 106.

The cloud/network edge entities network level 104 provides for a network fabric between the cloud network level and the lower tiers of the network including the connecting network entities network level 106 and the connected entities network level 108. In some examples, the cloud/network edge entities network level 104 is a fog computing network level. Fog computing generally refers to a networking system-level horizontal network structure that distributes resources and services of computing, storage, control, and networking from the connected entities/hardware of the network to the cloud level processing and storage of the network. The horizontal structure is shown in FIG. 1 by the nodes 104a and 104b of the network level 104, which provides some abstraction of a cloud network while residing closer to the connected entities in the connected entities network level 108 in the network 100 structure, thus effectively extending aspects of cloud computing down into lower levels of the network 100. Fog computing allows for data storage, communication, and management/processing to be accomplished closer to the data source of the connected entities in the connected entities network level 108. In some examples, fog computing is a step above an edge computing level in a distributed network, where edge computing also allows for processing to be accomplished even closer to the data source thus reducing network latency and decreasing network bandwidth requirements.

The connecting network entities network level 106 is a network level providing a connection to the network 100 to entities connected to the network such as in the connected entities network level 108. In some examples, the connecting network entities network level 106 is an edge computing network level. Edge computing generally refers to a network system-level that locates computing, storage, control and network resources as close as possible to connected entities in the network. This allows for fast and efficient response to some application functions/processes in the network while reducing bandwidth requirements and latency. For example, in many internet-of-things (IoT) applications, connected IoT devices in the network level 108 produce large amounts of data and processes that in some cases can be sent to a cloud network level 102 for processing, but in time-sensitive applications require immediate processing execution and responses at the network entities network level 106.

One example includes self-driving vehicles in the network level 108. The self-driving vehicles produce multiple types of data and generate processes and functions that can be handled by the network 100 either in near real-time or can be handled in a more long term manner. For example, historical tracking data for the self-driving car can be sent the cloud network level 102 for storage, analysis, and other processing. In another example, turn-by-turn directions require a quicker feedback loop and less latency and thus the data from the self-driving vehicles can be sent to a lower network level such as level 104 and/or level 106 for storage, analysis, and processing. In yet another example, some functions are executed on the self-driving car itself. For example, an obstacle avoidance function of the self-driving car needs immediate processing and response and is thus execute on the self-driving car itself with little interaction to the upper network levels. In some examples, self-driving vehicles may be required to perform continuous learning using an ML system either on-board the vehicle or in the connected network entities level 106. For example, driving conditions caused by snow, rain or wind may require continuous adaptations to the driving conditions. The self-driving vehicle and/or roadside network elements continuously updates driving dynamics models in an ML system based upon current, local road conditions for use in adapting to the conditions.

ML systems as described herein are an additional example applications/programs that operate on the network levels illustrated in network 100, both in IoT systems and in other types of applications running on distributed networks, such as network 100.

Figure 2:
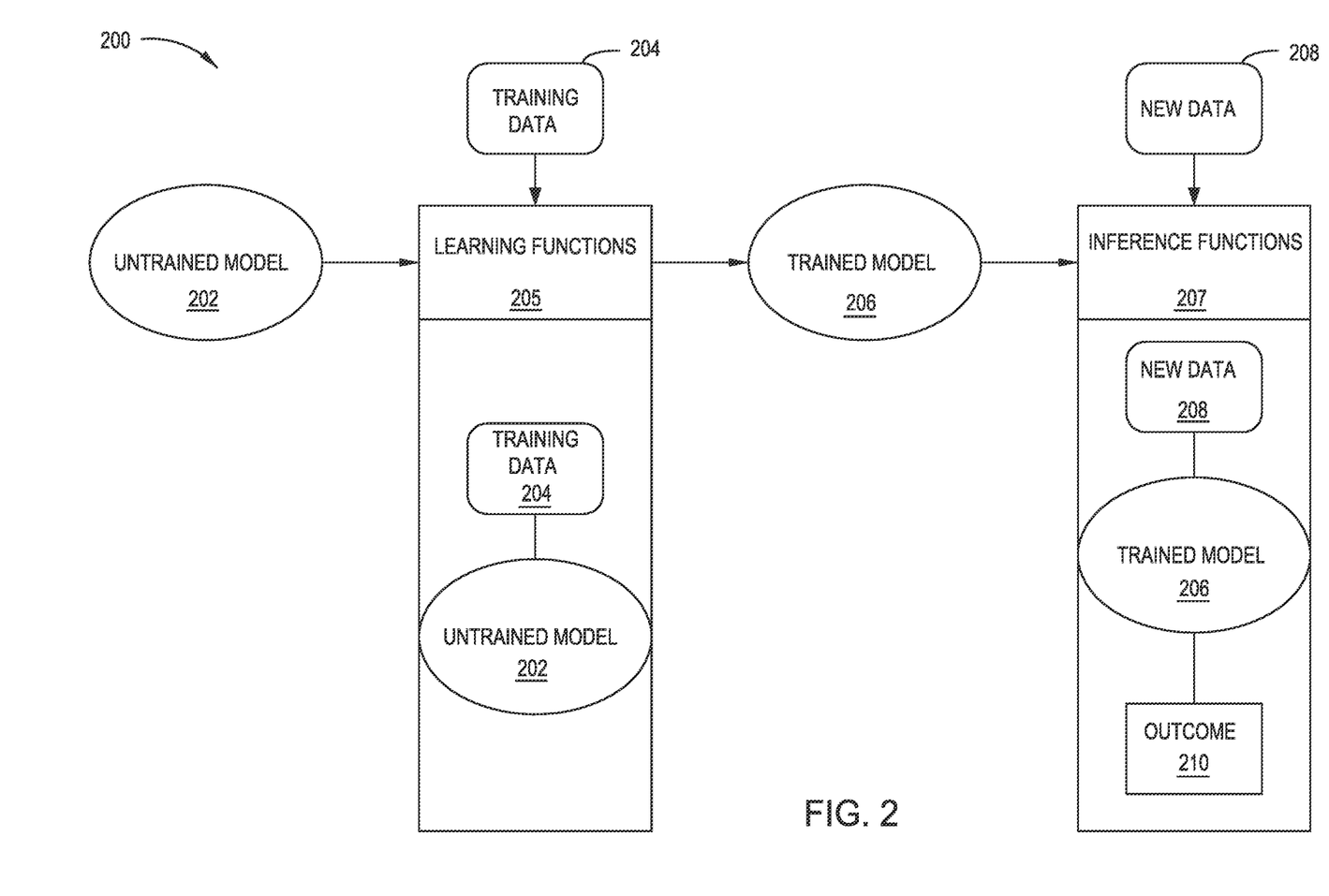
FIG. 2 illustrates a machine learning system, according to one embodiment.

FIG. 2 illustrates a machine learning system, according to one embodiment. For example, the ML system 200 is shown in FIG. 2, and includes the learning functions 205 and the inference functions 207. In general, the learning functions 205 are functions/processes that can execute on any level of the network 100 and are used to train ML models for use by various applications, such as IoT applications, in the network 100. The learning functions 205 use input components including the untrained model 202 and the training data 204 to produce a trained model 206. The learning functions 205 are generally resource/computing intensive since the produced trained model 206 may go through many learning iterations to achieve a well-trained model. Once the learning functions have completed the trained model 206, the model 206 is provided to the inference functions 207 of the ML system.

In general, the inference functions 207 are also functions/ processes that can execute on any level of the network 100 and are used to implement trained ML models for use by various applications, such as IoT applications, in the network 100. The inference functions 207 use input components including the trained model 206 and the new data 208 that may be derived from IoT sensor measurements of physical world parameters, or other sources to produce/infer an outcome 210. In some examples, the outcome 210 is a decision, selection, process for execution, etc. that is used by an application on the network 100. In some IoT applications, outcome 210 is used to control actuators that influence the physical world. In many IoT systems, the time delay between the availability of new data 208 and outcome 210 is critical—too much latency and control systems can become unstable or unsafe.

Figure 3:
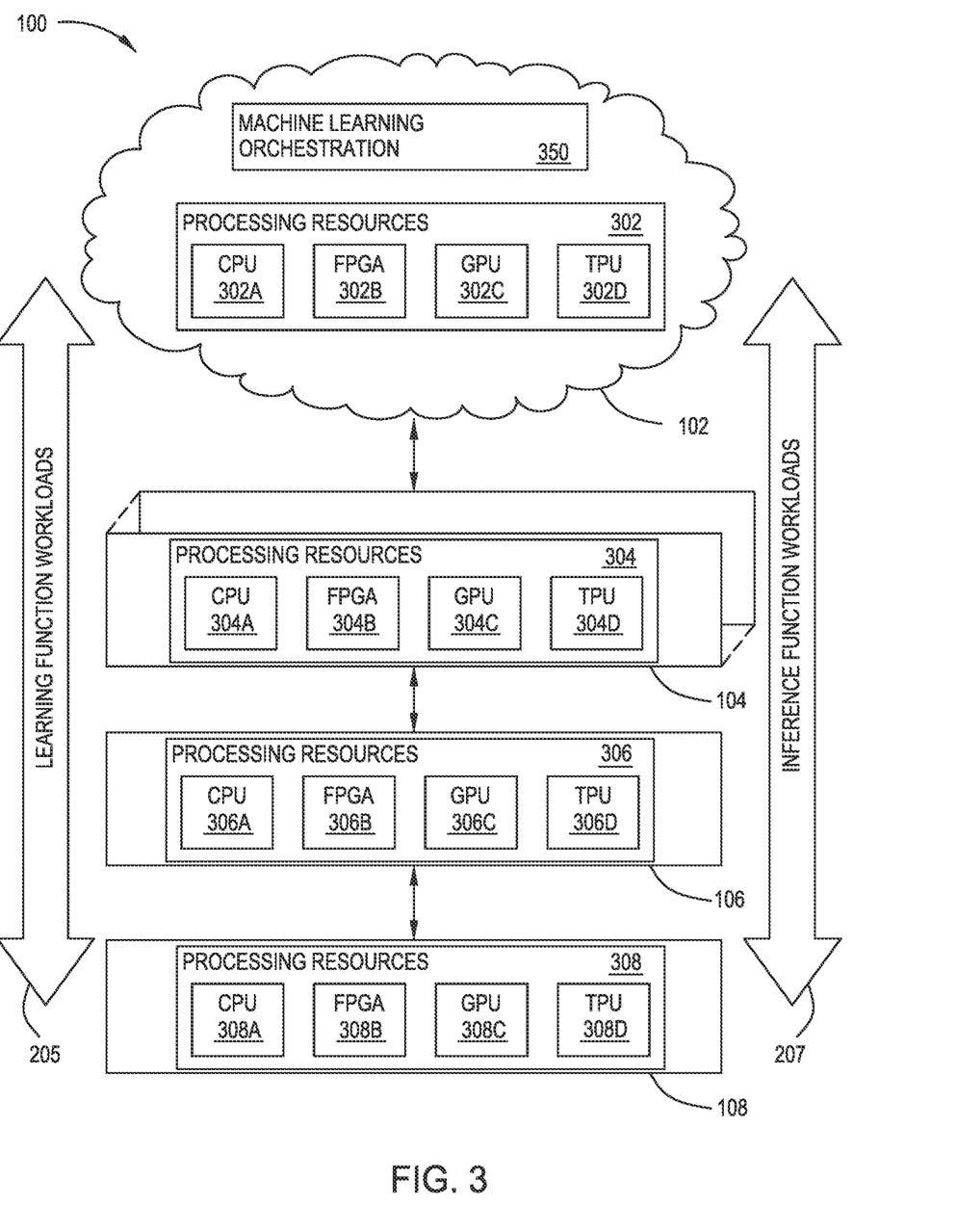
FIG. 3 illustrates a distributed network hosting a machine learning system, according to one embodiment.

FIG. 3 illustrates a distributed network 100 hosting a machine learning system, according to one embodiment. For example, as shown, the network 100 includes the machine learning orchestration module (MLOM) 350. In this example, the MLOM 350 is hosted in the cloud network level 102 and orchestrates the distribution and execution of a ML system 200, as described herein. The MLOM 350 uses performance data for the ML system 200 received from the various network levels and components described herein to determine an optimal orchestration of the ML system 200 in order to meet performance requirements and increase network efficiency. In some example embodiments, MLOM 350 is latency, network bandwidth, or reliability critical, and can be moved from the cloud network level 102 and/or distributed to lower levels of the edge/fog hierarchy.

In some examples, the MLOM 350 may also determine time and bandwidth requirements for the ML learning functions 205 to update the ML inference functions 207 on the network with new models, and if a deployment is underperforming performance requirements, may move both phases closer together in the hierarchy (e.g., to a same fog node), and optimize the choice of which processor type to use (e.g., use a multicore host CPU for the inference functions, and a TPU directly in the same network level for the learning phase). In some examples, a deployment is outperforming performance requirements, and therefore may be using too many costly network resources. In those situations, MLOM 350 may move the learning functions 205 and inference functions 207 further apart in the hierarchy, and choose less costly processing resources for one or both functions. In large, highly resource constrained networks, this allocation of resources and ability to reallocate resource between the learning functions and those used for the inference functions can help optimize overall system performance, efficiency, and security.

In some examples, the MLOM 350 deploys the ML learning functions 205 and the ML inference functions 207 as separate, but interrelated loads. For example, an IoT application may have critical requirements for rapid discovery of new patterns (the learning phase) followed immediately by rapid deployment of new inference functions based upon this learning in real-time systems. Since, the MLOM 350 manages both phases of the ML process in the ML system 200, the MLOM 350 can determine the optimal network level location and processing resource type to optimize the overall system performance and cost.

In some examples, the MLOM 350 receives performance data for the ML system 200 as telemetry data collected at the various network levels, including both the learning functions 205 and the inference functions 207. In some examples, the telemetry data includes throughput, latency, jitter, delay, network bandwidth utilization, processor occupancy/utilization, memory context size, number of applications/user served, security state, redundancy state, energy utilization, etc. The telemetry data can be collected from any component in the hierarchy to which the telemetry data is visible, including servers, fog nodes, edge gateways, routers, switches, storage engines, connected entities, etc. In some examples, connecting network entities 106 deliver the telemetry streams to MLOM 350 for analysis. Once the MLOM 350 obtains the performance data, the MLOM 350 uses the performance data to determine a performance level for the ML system 200. The performance level is compared to one or more performance requirements for the ML system 200. In some examples, the performance requirements include performance requirements received at the MLOM 350 from the ML system 200 and/or a user defined requirements.

In some examples, the MLOM 350 compares the determined performance level of the ML system 200 to the performance requirements for the ML system 200 and determines system adjustments to ML learning function and the ML inference functions to improve the performance of the ML system 200 and/or improve network efficiency. The system adjustments can include an adjustment to the network level on which the functions of the ML system 200 is executing. For example, the workloads of the learning functions 205 may be moved up or down the distributed network 100. For example, if the learning function 205 is not meeting a performance threshold due to latency between the connected entities network level 108 and a current network level that the learning function is executing on, the learning function 205 can be moved down the network 100. For example, when the learning functions 205 are executing in the cloud level 302, the determined system adjustments will include an adjustment down to the network levels 104, 106, or 108 to improve performance of the learning functions 205, and the ML system 200. Similarly, the determined system adjustments for the inference functions 207 may also include an adjustment to the network level on which the inference functions 207 are executing.

As shown in FIG. 3, each of the network levels has multiple processing resource types. For example, the cloud network level 102 includes a CPU 302a, a FPGA 302b, a GPU 302c, and a TPU 302d. Likewise, each of the network levels 104, 106, and 108 include corresponding CPUs (304a, 306a, 308a), FPGAs (304b, 306b, 308b), GPUs (304c, 306c, 308c), and TPUs (304d, 306d, 308d) as shown in FIG. 3. In some examples, the determine system adjustment step includes a change to the processing resource type where the learning functions 205 and the inference functions 207 are executing. For example, if the ML system 200 is not meeting performance requirements due to slow processing of data and data training by learning functions 205 and/or slow execution of a trained model by the inference functions 207, the learning functions 205 and/or the inference functions 207 may be moved to a faster processing resource type. For example, the functions may be moved from a CPU to a FPGA, GPU, and/or TPU.

The MLOM 350 may also determine a reallocation of resources dedicated to either the learning functions 205 and/or the inference functions 207. For example, if the learning functions 205 require an increased amount of resources on a network level and the inference functions 207 are over-performing the performance requirements, the processing resources on the network level may be reallocated to ensure the learning functions 205 meet the performance requirements, thus better balancing system resource allocation.

An example ML system 200 in the network 100 includes a system providing boundary security to a mission critical subnetwork such as a distributed enterprise firewall for distributed IoT devices. In this example, a hierarchy of resources and ML system functions at the network levels 106, 104, and 102 (edge, fog, and cloud levels) all cooperate to detect security threats to the connected IoT devices and the network. The ML functions then react to the security threats. In some examples, the security risks and threats of this subnetwork are very high, and the density and variety of security assaults is ever increasing and highly dynamic. In this example, performance requirements for the ML system require frequent and responsive training of the ML system to detect and respond to fresh zero-day exploits. In some examples, this can be accomplished by leveraging the cloud network level 102 to perform learning functions and the network levels 104, 106, and 108 for the inference functions. Systems as known in the art perform batch processing of collected observations of network traffic in the cloud, determine if there are any new security threats, and update ML models in remote inference systems to protect the network. The update frequency between a new threat first appearing on the network and all the remote nodes being updated may be on the order of hours or days, and this is too slow for critical network security.

In some examples, such as an increased number of attempted exploits on the subsystem, the performance requirements may require that the ML system 200 to respond to "zero second" exploits, where the ML system learns new security threat patterns in milliseconds after they first arise, and begins to mitigate and respond to those threats immediately. For example, if the learning functions 205 workload suddenly increases in response to a constellation of distributed denial of service (DDoS) attackers, the MLOM 350 determines system adjustments that move the learning functions from the cloud network level 102 to a fog hierarchy in the cloud/network edge entities level 104. In some examples, the fog hierarchy provides a better distribution of the learning functions 205, provides a higher bandwidth access to full wire speed traffic since it is lower in the network 100, and reduces the latency between the source of the attacks, such as the connected entities network level 108 and the learning functions. Additionally, the MLOM 350 may also determine a system adjustment to cause the portions of the learning functions to move from a default processing resource type (CPUs) to a higher throughput processing resource type (TPUs) for the duration of the overload, to exploit their much greater learning throughput.

Figure 4:
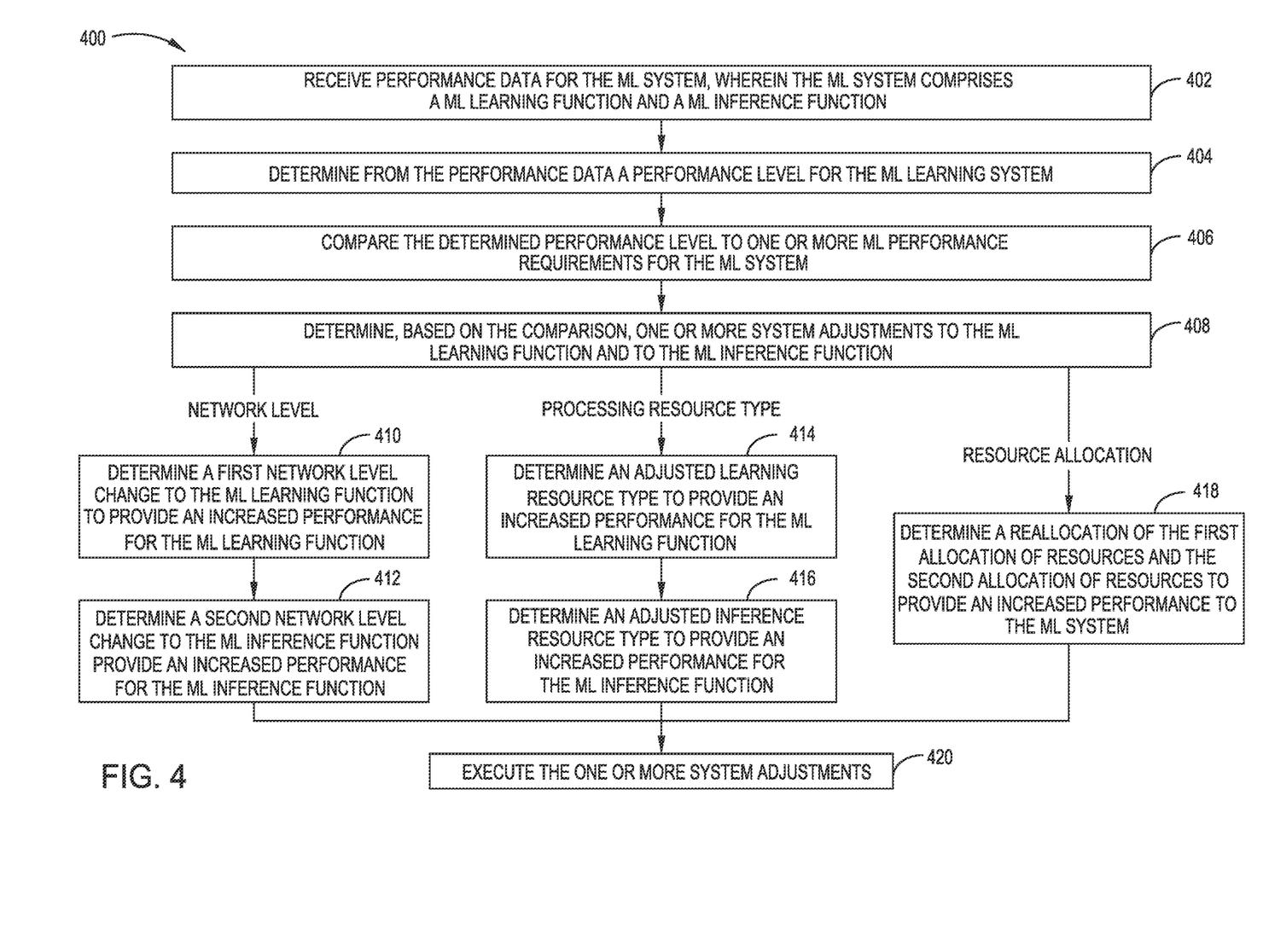
FIG. 4 is a flow chart outlining general operations for dynamically orchestrating a machine learning (ML) system on a network according to embodiments described herein.

Similarly, the inference functions may also be moved and adjusted. For example, the ML inference functions 207 are initially deployed on a certain set of the processing resources for a typical load (e.g., CPU 304a), but if a surge in workloads is detected by the MLOM 350, the ML inference function 207 is redeployed to bring additional and/or higher performing resources (e.g., a FPGA 304b or GPU 304c) to bear on the additional workloads until the overload subsides FIG. 4 is a flowchart outlining general operations for dynamically orchestrating a machine learning (ML) system on a network according to embodiments described herein. Method 400 begins at block 402, where the MLOM 350 receives performance data for the ML system 200, where the ML system includes a ML learning function (ML learning functions 205) and a ML inference function (ML inference functions 207).

At block 404, the MLOM 350 determines from the performance data a performance level for the ML system. For example, the MLOM 350 determines a current performance level of the ML system for each of the various performance requirements for the ML system 200. For example, the MLOM 350 determines a throughput, latency, and/or other factors performance metrics for the ML system 200 including the ML learning functions 205 and the ML inference functions 207. At block 406, the MLOM 350 compares the determined performance level to one or more ML performance requirements for the ML system. For example, the MLOM 350 can compare the latency of the functions of the ML system to the latency requirements for the ML system 200.

At block 408, the MLOM 350 determines, based on the comparison, one or more system adjustments to the ML learning function and to the ML inference function. For example, when the ML system 200 is deployed and executes on one or more of the network levels 102-108 within the network 100, the MLOM 350 determines a change to the one or more network levels. In some examples, the change is to increase the performance level (e.g., improve the latency level) to match the ML system performance requirements. In another example, the change is to improve the network resource use efficiency. For example, the ML functions may be redeployed to reduce network costs, if the performance of the ML system 200 is better than the performance requirements. In some examples, to prevent deployment oscillations, ML functions are redeployed to reduce network costs only after a threshold, such as a time or performance level threshold, is passed.

For example, at block 410, the MLOM 350 determines a first network level change to the execution level of the ML learning function to provide an increased performance for the ML learning function, and at block 412, the MLOM 350 determines a second network level change to the execution level of the ML inference function to provide an increased performance for the ML inference function. For example, when the ML system 200 is a ML system for a distributed firewall, the MLOM 350 determines to adjust the network level of the ML learning functions 205 from the cloud network level 102 to a lower level such as the network edge level 104 to move the learning functions closer to the data source. Additionally, the MLOM 350 determines to adjust the ML inference functions 207 from the network level 104 to the network level 106 and/or the network level 108 to allow the implementation of the learning modules at the ML inference functions 207 closer to the source data such as the source of the DDoS attack. While this example is described in multiple network levels, the ML learning functions 205 and the ML inference functions 207 may also be deployed and execute on a same network level (e.g., both on network level 106).

While described above in relation to increased performance for the ML learning function and the ML inference function, the MLOM 350 may also determine a first and second network level change to reduce a network utilization expense of the ML system. For example, after a threat has subsided for the distributed firewall, the MLOM 350 determines to adjust the network level of the ML learning functions 205 to an optimized deployment for ML system costs on the network 300. For example, the ML learning function may move from a lower network level to the cloud network level 102.

Additionally, when the ML system 200 is deployed and executes on one more processing resource types (e.g., CPU/FPGA/GPU/TPU) within the network levels, the MLOM 350 can determine a change to the one or more processing resource types. At block 414, the MLOM 350 determines an adjusted learning processing resource type to provide an increased performance for the ML learning function and at block 416, the MLOM 350 determines an adjusted inference processing resource type to provide an increased performance for the ML inference function. For example, when the ML learning functions 205 desire increased resources for a large load of new data processing, such as a new attack on the distributed firewall, the MLOM 350 may determine to move the ML learning functions from a CPU (CPU 340a) in a network level to a processing resource with increased capacity such as a TPU (TPU 304d). Likewise, if a change to the ML inference functions 207 is needed, the MLOM 350 may also determine an adjustment from a lower level processing resource (FPGA 306b) to a higher throughput processing resource (GPU 306c). In some examples, the determination to move ML functions comprises a cost function balanced against an expected performance improvement. For example, if a 2× performance increase is needed for the ML learning function, the ML learning function moves from a CPU to a GPU. In another example, if a 10× improvement is needed, the ML learning function moves from CPU to TPU. In general, the ML functions are only moved to processing resources that will meet the performance requirements and not higher in order to reduce the processing costs of the ML system.

While described above in relation to increased performance for the ML learning function and the ML inference function, the MLOM 350 may also determine adjusted processing resource type changes to reduce a network utilization expense of the ML system. For example, after an increased capacity process resource is no longer needed for the ML learning functions 205, the MLOM 350 determines to adjust the processing resources utilized by the ML functions 205 to an optimized deployment for ML system costs on the network 300. For example, the ML learning functions 205 workloads may move from a TPU to a CPU.

The MLOM 350 can also reallocate resource allocations for the various ML functions. For example, the ML learning function executes on a first allocation of resources and the ML inference function executes on a second allocation of resources. At block 418, the MLOM 350 determines a reallocation of the first and second allocations of resources to provide an increased performance to the ML system. For example, if ML inference functions are executing below the performance parameters on a network node and/or network level and the ML learning functions are over-performing, the allocation of the processing resource dedicated to the ML learning functions may be reallocated to the ML inference functions, such that the workloads of the inference functions may be processed more efficiently. The resource reallocation may also include a reallocation of resources across several network nodes and/or network levels.

At block 420, the MLOM 350 executes the one or more system adjustments. in some examples, the MLOM 350 executes the system adjustments for the ML system 200 by causing containers on the various determined network levels, processing resources, and/or reallocated processing resources, to begin execution and instructs the ML functions to begin utilizing the containers on the determined network levels and processing resources. In some examples, the MLOM 350 uses a container based control messaging system to implement the one or more system adjustments.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

The flowchart and block diagrams in the Figs. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for dynamically orchestrating a machine learning (ML) system on a network comprising:
    receiving, at an ML orchestration system for the network, performance data for the ML system, wherein the performance data comprises telemetry data indicating performance of (i) training ML models of the ML system and (ii) performance of implementing trained ML models of the ML system;
    determining, from the performance data, (i) a performance level for training the ML models, and (ii) a performance level for implementation of the trained ML models;
    comparing the determined performance levels to one or more ML performance requirements for the ML system;
    determining, based on the comparison, one or more system adjustments to (i) the training of the ML models using a first allocation of computing resources and (ii) to the implementation of the trained ML models using a second allocation of computing resources, further comprising:

determining a reallocation of the first allocation of computing resources and the second allocation of resources based on the performance levels, wherein the reallocation comprises deploying workloads for the training of the ML models or the implementation of the trained ML models from a first network level to a second network level; and executing the one or more system adjustments, further comprising:
altering the training of the ML models and the implementation of the trained ML models to execute using the reallocation.

2. The method of claim 1, wherein the ML system executes on one or more network levels within the network, wherein the one or more system adjustments comprises a change to the one or more network levels, wherein determining the one or more system adjustments comprises:

determining a first network level change to an execution level of the training of the ML models to provide an increased performance for the training of the ML models; and determining a second network level change to an execution level of the implementation of the trained ML models to provide an increased performance for the implementation of the trained ML models; and wherein executing the one or more system adjustments comprises:
altering the execution level of the training of the ML models according to the first network level change; and
altering the execution level of the implementation of the trained ML models according to the second network level change.

3. The method of claim 2, wherein the one or more network levels comprise at least one of:
a cloud network level;
a cloud edge entities network level;
a connecting network entities network level; and
a connected entities network level.

4. The method of claim 1, wherein the ML system executes on one or more processing resource types, wherein the one or more system adjustments comprises a change to the one or more processing resources, and wherein determining the one or more system adjustments comprises:

determining an adjusted learning resource type to provide an increased performance for the training of the ML models;

determining an adjusted inference resource type to provide an increased performance for the implementation of the trained ML models; and wherein executing the one or more system adjustments comprises:
altering the training of the ML models to execute on the adjusted learning resource type; and
altering the implementation of the trained ML models to execute on the adjusted inference resource type.

5. The method of claim 4, wherein the one or more processing resource types comprise at least one of:
a central processing unit (CPU);
a field programmable gate array (FPGA);
a graphics processing unit (GPU); and
a tensor processing unit (TPU).

6. The method of claim 1, wherein the one or more system adjustments comprise adjustments to reduce a network utilization expense of the ML system.

7. A system for dynamically orchestrating a machine learning (ML) system on a network, comprising:
a processor; and
a memory comprising instructions which, when executed on the processor, performs an operation, the operation comprising:

receiving, at an ML orchestration system for the network, performance data for the ML system, wherein the performance data comprises telemetry data indicating performance of (i) training ML models of the ML system and (ii) performance of implementing trained ML models of the ML system;

determining from the performance data, (i) a performance level training the ML models, and (ii) a performance level for implementation of the trained ML models;

comparing the determined performance levels to one or more ML performance requirements for the ML system;

determining, based on the comparison, one or more system adjustments to (i) the training of the ML models using a first allocation of computing resources and (ii) to the implementation of the trained ML models using a second allocation of computing resources, further comprising:

determining a reallocation of the first allocation of computing resources and the second allocation of resources based on the performance levels, wherein the reallocation comprises deploying workloads for the training of the ML models or the implementation of the trained ML models from a first network level to a second network level; and executing the one or more system adjustments, further comprising:
altering the training of the ML models and the implementation of the trained ML models to execute using the reallocation.

8. The system of claim 7, wherein the ML system executes on one or more network levels within the network, wherein the one or more system adjustments comprises a change to the one or more network levels, wherein determining the one or more system adjustments comprises:

determining a first network level change to an execution level of the training of the ML models to provide an increased performance for the training of the ML models; and determining a second network level change to an execution level of the implementation of the trained ML models to provide an increased performance for the implementation of the trained ML models; and wherein executing the one or more system adjustments comprises:
altering the execution level of the training of the ML models according to the first network level change; and
altering the execution level of the implementation of the trained ML models according to the second network level change.

9. The system of claim 8, wherein the one or more network levels comprise at least one of:
a cloud network level;
a cloud edge entities network level;
a connecting network entities network level; and
a connected entities network level.

10. The system of claim 7, wherein the ML system executes on one or more processing resource types, wherein the one or more system adjustments comprises a change to the one or more processing resources, and wherein determining the one or more system adjustments comprises:

determining an adjusted learning resource type to provide an increased performance for the training of the ML models; and determining an adjusted inference resource type to provide an increased performance for the implementation of the trained ML model; and wherein executing the one or more system adjustments comprises:

altering the training of the ML models to execute on the adjusted learning resource type; and     altering the implementation of the trained ML models to execute on the adjusted inference resource type.

11. The system of claim 10, wherein the one or more processing resource types comprise at least one of:

a central processing unit (CPU);

a field programmable gate array (FPGA);

a graphics processing unit (GPU); and a tensor processing unit (TPU).

12. The system of claim 7, wherein the one or more system adjustments comprise adjustments to reduce a network utilization expense of the ML system.

13. A computer program product for dynamically orchestrating a machine learning (ML) system on a network, the computer program product comprising a non-transitory computer-readable medium program having program instructions embodied therewith, the program instructions executable by a processor to perform an operation comprising:

receiving, at an ML orchestration system for the network, performance data for the ML system, wherein the performance data comprises telemetry data indicating performance of (i) training ML models of the ML system and (ii) performance of implementing trained ML models of the ML system;

determining, from the performance data, (i) a performance level for training the ML models, and (ii) a performance level for implementation of the trained ML models;

comparing the determined performance levels to one or more ML performance requirements for the ML system;

determining, based on the comparison, one or more system adjustments to (i) the training of the ML models using a first allocation of computing resources and (ii) to the implementation of the trained ML models using a second allocation of computing resources, further comprising:

determining a reallocation of the first allocation of computing resources and the second allocation of resources based on the performance levels, wherein the reallocation comprises deploying workloads for the training of the ML models or the implementation of the trained ML models from a first network level to a second network level; and     executing the one or more system adjustments, further comprising:

altering the training of the ML models and the implementation of the trained ML models to execute using the reallocation.

14. The computer program product of claim 13, wherein the ML system executes on one or more network levels within the network, wherein the one or more system adjustments comprises a change to the one or more network levels, wherein determining the one or more system adjustments comprises:

determining a first network level change to an execution level of the training of the ML models to provide an increased performance for the training of the ML models; and     determining a second network level change to an execution level of the implementation of the trained ML models to provide an increased performance for the implementation of the trained ML models; and     wherein executing the one or more system adjustments comprises:

altering the execution level of the training of the ML models according to the first network level change; and         altering the execution level of the implementation of the trained ML models according to the second network level change.

15. The computer program product of claim 14, wherein the one or more network levels comprise at least one of:

a cloud network level;

a cloud edge entities network level;

a connecting network entities network level; and a connected entities network level.

16. The computer program product of claim 13, wherein the ML system executes on one or more processing resource types, wherein the one or more system adjustments comprises a change to the one or more processing resources, and wherein determining the one or more system adjustments comprises:

determining an adjusted learning resource type to provide an increased performance for the training of the ML models;

determining an adjusted inference resource type to provide an increased performance for the implementation of the trained ML models; and     wherein executing the one or more system adjustments comprises:

altering the training of the ML models to execute on the adjusted learning resource type; and         altering the implementation of the trained ML models to execute on the adjusted inference resource type.

17. The computer program product of claim 16, wherein the one or more processing resource types comprise at least one of:

a central processing unit (CPU);

a field programmable gate array (FPGA);

a graphics processing unit (GPU); and a tensor processing unit (TPU).

\* \* \* \* \*